United States Patent [19]

Lechthaler

[11] Patent Number: 4,544,563

[45] Date of Patent: Oct. 1, 1985

[54] PROCESS OF PREPARING A GELLED PASTA PRODUCT

[75] Inventor: Jürg Lechthaler, Zurich, Switzerland

[73] Assignee: Nestec S. A., Vevey, Switzerland

[21] Appl. No.: 526,429

[22] Filed: Aug. 25, 1983

[30] Foreign Application Priority Data

Sep. 23, 1982 [CH] Switzerland ............... 5619/82

[51] Int. Cl.[4] .................. A23L 1/04; A21D 8/00
[52] U.S. Cl. ................... 426/276; 426/557; 426/573; 426/575; 426/577
[58] Field of Search ........... 426/271, 276, 557, 575, 426/577, 573

[56] References Cited

U.S. PATENT DOCUMENTS

| | | | |
|---|---|---|---|
| 3,455,697 | 7/1969 | Atkinson | 426/276 |
| 3,891,776 | 6/1975 | Carpenter et al. | 426/276 |
| 4,044,165 | 8/1977 | Baumann | 426/557 |
| 4,269,863 | 5/1981 | Inagami et al. | 426/276 |
| 4,435,435 | 3/1984 | Hsu | 426/557 |

FOREIGN PATENT DOCUMENTS

| | | | |
|---|---|---|---|
| 2033545 | 2/1972 | Fed. Rep. of Germany | 426/276 |
| 45-16063 | 6/1970 | Japan | 426/271 |
| 0883976 | 12/1961 | United Kingdom | 426/276 |
| 2110915 | 6/1983 | United Kingdom | 426/557 |

*Primary Examiner*—Raymond Jones
*Assistant Examiner*—Elizabeth C. Weimar
*Attorney, Agent, or Firm*—Vogt & O'Donnell

[57] ABSTRACT

The invention relates to a process for the production of pasta based on starchy materials by gelatinization, extrusion and drying. A flour or semolina of a starchy material is mixed with soft water and an ionic gelling agent to obtain a dough containing from 35 to 55% of water, the dough is gelatinized by heating and kneading under pressure, is then cooled to a temperature below 100° C., extruded in the form of pasta, and the pasta is brought into contact with water containing a cation which forms a gel with the ionic gelling agent, and is dried. The pasta produced may be based on rice or maize alone.

12 Claims, No Drawings

PROCESS OF PREPARING A GELLED PASTA PRODUCT

This invention relates to a process for the production of pasta based on starchy materials by gelatinisation, extrusion and drying operations.

The domestic and small-scale production of rice noodles has long been widespread in Eastern rice-producing countries. The processes which are used vary from one region or from one country to another, but they are all based on a small number of basic operations which are linked and/or repeated as dictated by the local traditions and also as a function of the particular qualities of the local types of rice. The fundamental problem is to confer to the rice dough the cohesion which it lacks. The low protein content of the rice on the one hand and the very nature of these proteins on the other hand means that it is impossible to produce a network with rice which is comparable to that formed by wheat gluten in such products as bread or pasta. In order to replace this network in which the starch grains are embedded, it is necessary to either use binders, or to subject the starch grains to treatments, so that they are capable on their own of forming a mass having the necessary cohesion. These problems of cohesion are re-encountered at the stage of working the fresh pasta dough as well as at the stage of the reconstitution and consumption of the final product.

The number of conventional and typical basic operations may include for example soaking the grains of rice, wet milling, pre- and post-gelatinisation, cooling and mechanical working of the dough. Thus, a typical, conventional process includes the successive stages of soaking a ground rice over a period of several hours, pre-gelatinisation, cooling, extrusion, post-gelatinisation and drying. Moreover, the following may be mentioned as conventional binders which have been proposed: egg proteins, soluble proteins of whey, or wheat gluten, for example. In particular, processes are known in which ground rice is used combined with wheat flour, which is not obvious, because if ground rice mixed with wheat flour is pregelatinised, the wheat gluten is denatured and it is no longer possible to shape the dough.

In order to simplify the small-scale production process of Eastern rice pasta known in South East Asia under the name of "Beehoon" and to guarantee a constant quality of production, an industrial production process has been proposed, in which the grains of rice are dry ground and 10 parts of the resulting flour are mixed with 4 parts by weight of hot water. The dough is kneaded and passed through a sieve to produce grains of about 4 mm$^3$. The grains are subjected to lengthy steaming, then cooled and extruded a first time. The strips or tubes thus formed are cut into short pieces which are delivered to a second extruder where they are re-worked. The second extruder produces long vermicelli or spaghetti which are suspended on horizontal bars, subjected to a lengthy steaming operation, and then dried. A process of this type still has too many extrusion and steam-treatment operations, and the latter necessitate in particular very large installations.

Moreover, in order to allow the production of rice pasta, incorporating therein wheat flour, it has been proposed initially to soak and boil the rice, then to mix it with wheat flour, form a sheet of the mixture, cut the sheet into noodles and then dry and pack them. However attractive a process of this type may be on a technical level, it is hardly rational when, for example, the local starting material is rice and not wheat.

Finally, a process has been described in which soya flour and cornflour are used to replace most of the wheat flour in the production of pasta. In this process, the part which is played by the various components on the one hand and the gelatinisation on the other hand is discussed, with the objective of compensating for the absence of wheat gluten. Moreover, the possibility of using certain additives, such as gelling agents is also mentioned. However, this process does not allow pasta to be produced from maize alone in a simple, industrial manner, not to mention pasta based, for example, only on rice, and does not disclose how this would be possible.

An object of the present invention is to provide a process for the production of pasta based on starchy materials which does not have the above-mentioned disadvantages of the known processes, as much regarding the number of operations as the equipment and starting materials, which process is, however, simple to carry out and allows the use of rice or maize on its own, as well as other starchy materials, such as potato or legumes.

The process according to the present invention is characterised in that a flour or semolina of a starchy material is mixed with soft water and an ionic gelling agent to obtain a dough containing from 35 to 55% of water, the dough is gelatinised by heating and kneading under pressure, it is then cooled to a temperature below 100° C., extruded in the shape of pasta, the pasta is brought into contact with water containing a cation which forms a gel with said ionic gelling agent, and the pasta is then dried.

Thus, the present process is notable for its simplicity, a single gelatinisation stage and a single extrusion stage. None of the known processes has attained this simplicity, in spite of all the efforts made in this direction. However, the present process is also noteworthy for the quality of the products which may be obtained thereby, and these products may be considered equal to the best corresponding Eastern small-scale products. Finally, the present process is very economic, not only because it requires less equipment and fewer operations compared to the known processes, but also because it guarantees minimum losses of starting material during production and even in the home, that is, during cooking.

To carry out the present process, it is possible to use any vegetable starting material which is rich in starch and is consequently classified as a starchy material by food product specialists, in particular grains of cereals and legumes, and tubers which are rich in starch, such as potatoes or yams. Rice or maize is preferably used.

It is also possible to incorporate a starch supplement rich in amylose in the said dough containing from 35 to 55% of water, in particular to compensate for a relatively high protein content, as in the case of legumes, or to compensate for a relatively high amylo-pectin content, as in the case of potatoes.

The extent of milling of the flour or semolina of the said starchy material may be selected as a function of the dimensions of the openings of the extrusion die. The operation is preferably carried out to a grain fineness which allows the grains to pass singly through the openings. In effect, the coarser the grain, the easier and more complete the gelatinisation operation.

An acid polysaccharide, such as a pectate, an alginate or carboxymethylcellulose may be used as the ionic gelling agent. Particularly good results are obtained using sodium alginate. The ionic gelling agent may be added in a proportion of from 0.5 to 2% by weight of the dough.

An alkaline-earth metal ion is preferably selected as the cation forming a gel with said ionic gelling agent. An ion which is particularly desirable in terms of food and which is very suitable for the present use is the divalent calcium ion.

It is important to prepare the initial mixture with soft water. It has been found that if the mixture of flour or semolina and ionic gelling agent is prepared with hard water, the extruded dough loses all cohesion and disintegrates. The term "soft water" is to be understood as designating water with a calcium ion concentration of less than $2 \times 10^{-4}$M.

The gelatinisation of the dough by heating and kneading under pressure is preferably carried out under a pressure of from 70 to 100 bars at a temperature of from 60° to 100° C. over a period of from about 20 to 120 seconds. If this operation is carried out at a higher pressure or at a higher temperature, it is difficult to avoid an expansion of the dough at the outlet of the extruder. If attempts are made to reduce the viscosity of a dough, which is possibly too viscous, by further increasing the temperature during gelatinisation, the excessive viscosity returns during cooling before extrusion and stops the dough passing through the die. On the other hand, if the operation is carried out at a pressure below 70 bars and at a temperature lower than 60° C., the extruded dough is too soft and it disintegrates due to insufficient gelatinisation. As far as the effects of the duration of the treatment are concerned, it is possible to say that too short a treatment also entails insufficient gelatinisation and a treatment duration which is prolonged so that it is longer than necessary represents a useless expenditure of energy. The range of from 20 to 120 seconds is to be considered as indicating a practical order of magnitude rather than categorical limits. In fact, although the moment when the dough emerges from the die may be determined with some degree of precision, the starting point in a continuous installation is uncertain because of some backwards and forwards motion of the starting material which is being engaged.

The sufficiency or insufficiency of the gelatinisation are practical ideas which are linked with the sufficient or insufficient cohesion of the dough at the outlet of the extruder on the one hand and of the reconstituted and cooked dough on the other hand. However, if numerical expressions are preferred, it may be indicated by way of guidance that, for rice and maize, a gelatinisation of from 70 to 100% may be considered as suitable, whereas a gelatinisation below 70% may entail difficulties, such as pasta which is too soft at the outlet of the extruder, or pasta which disintegrates during cooking.

The dough is then cooled to a temperature below 100° C. to avoid an expansion at the outlet of the extruder under the effect of the vapour which expands inside the dough and seeks to escape. It is recommended to cool the dough to a temperature of from 55° to 90° C., since too low a temperature is unfavourable from the point of view of the viscosity of the dough to be extruded.

In order to bring the extruded pasta into contact with water containing the cation which forms a gel with the ionic gelling agent, it is possible to either sprinkle the pasta with a jet of this water when it passes out of the extrusion die or to plunge it for an instant into a bath of this water. The extruded pasta is preferably continuously passed through water at from 20° to 70° C. containing the cation in a concentration of from 0.05 to 0.2M over a period of from 2 to 30 seconds.

In order to prevent the water which clings to the surface of the pasta after this treatment from causing the individual pieces of pasta to stick together or to themselves, in particular during the optional subsequent shaping into balls or nests, it is possible to remove most of this water, for example by blowing air. It has been found that this operation is best carried out if air is blown downwards onto the pasta which is positioned on a foraminous support, such as an open mesh endless belt and if air is simultaneously drawn up by suction under the support.

It has been found that the drying operation of the pasta properly speaking may be carried out fairly rapidly at a moderate temperature and at a moderate to high relative humidity. Drying at a temperature of from 50° to 90° C. may be recommended at a relative humidity of from 30 to 90% over a period of from 2 to 4 hours. It has also been found that the pasta thus obtained may check during storage, but that it is possible to avoid this phenomenon by abruptly cooling the pasta after drying. This abrupt cooling may be carried out by circulating the pasta in a flow of, for example cold and humid air.

The present process may be carried out using conventional apparatus, such as kneading troughs, presses and driers employed in the pasta industry. It lends itself particularly well to production in a compact apparatus of the single- or double-screw extruder type provided with a casing divided into successive sections which may be brought to different temperatures by the circulation of fluids at suitable temperatures.

The following Examples are provided by way of illustration. The percentages and parts used therein are by weight.

In these Examples, the organoleptic information concerns above all the texture of the cooked pasta. Although the taste of a pasta is easily reproducible and rarely suffers from troublesome defects unless the starting material itself is not of a satisfactory quality, its texture or behaviour when chewed is particularly critical. The quality of this texture is not necessarily well reflected by examination using apparatus which measure the resistance to crushing. A crisp pasta (referred to as "al dente" in Italy) may offer less resistance to crushing than, for example a sticky pasta. An elastic pasta, to the liking of the Orientals can produce values which may be confused with those obtained for crisp pasta using the same instrument.

In these Examples, the degree of gelatinisation was determined by the enzymatic method according to R. M. Shetty, D. R. Lineback and P. A. Seib, Cereal Chemistry 51, 364–375 (1974). The losses during cooking were determined by cooking 1 part of pasta in 9 parts of water, drying the pasta and comparing it with the initial pasta. Controls were carried out by concentrating the cooking water and drying and weighing the residue.

EXAMPLE 1

A round grain rice (*Oryza sativa japonica*)semolina is mixed continuously with soft water containing about $1 \times 10^{-4}$M of $Ca^{++}$ and with sodium alginate in order to obtain a dough containing from 45 to 50% of water, and 0.66% of sodium alginate. This mixture is produced in the first part of a double screw extruder having different successive zones surrounded by independent jackets in which it is possible to circulate fluids at different temperatures. In the present case, the extruder has half a dozen successive zones in which the operations of mixing, kneading, gelatinisation, cooling and extrusion follow one another without interruption.

The starting materials, water, ground rice and alginate are then poured through a hopper into the first zone of the extruder. The simple mixing operation continues in a second zone. In these first zones or in the first part of the extruder, the flights are wide apart and are simply positioned in order to mix the material and to advance it into the extruder.

In the following zones, the dough is thoroughly kneaded and subjected to considerable shearing stresses between the screws, the flights of which are closer and overlap more intimately. The exact arrangement of the screws and of the pitches is set up and the rotational speed of the screws is adjusted so that a pressure of about 95 bars prevails in these zones or in this second part of the extruder. A heating fluid is circulated in the corresponding jackets so that the temperature of the dough is maintained just below 100° C. under the effect of this heating and of the heat generated by the friction. The passage of the dough in this second part of the extruder takes on average 90 seconds.

In the last zone or in the third and last part of the extruder, the screws are arranged and adjusted in order to exert a thrust on the gelatinised dough in order to force it through the extrusion die. A cooling fluid is circulated in the jacket of this last part so that the temperature of the extruded pasta is from about 75° to 80° C. at the moment when it emerges from the die. The die itself comprises a thick steel plate pierced by a plurality of small holes having a diameter of 0.9 mm.

At the outlet of the die, the pasta has a degree of gelatinisation of 100%. It is immediately plunged or drawn out continuously in a bath containing 2% of $CaCl_2$. The residence time of the pasta in this bath is about 8 seconds. It is then positioned on an open mesh endless belt and is simultaneously passed under a strong vertical flow of air and above a strong-suction orifice. It is then cut into long pieces and arranged into balls.

The pasta is then dried over a period of 3 hours at a temperature of 50° C. at a relative humidity of 30%. It is then abruptly cooled under a strong flow of cold air at 30° C. and under 90% relative humidity.

The rice pasta thus obtained resembles a tangled glass fibre. It does not stick during cooking. The losses during cooking are less than 5%. The pasta is ready for consumption after cooking for 4 to 5 minutes in gently boiling water, in a proportion of 75 g of pasta and 1.5 g of salt per half liter of water. It has an elastic texture judged as excellent and typical by experienced tasters in the countries of origin of these Oriental noodles.

EXAMPLE 2

Rice pasta is produced in the manner described in Example 1, but using a round grain rice flour. Pasta of a quality comparable to that obtained in Example 1 is obtained. However, the pasta of Example 1 has a substantially firmer texture.

EXAMPLE 3

Rice pasta is produced in the manner described in Example 1, but using a long grain rice (*Oryza sativa indica*)semolina. Pasta of a quality comparable to that obtained in Example 1 is produced.

EXAMPLE 4

Maize pasta is prepared using an extruder similar to the one described in Example 1.

A dry mixture containing 99% of cornflour and 1% of sodium alginate is prepared. This dry mixture and soft water are continuously introduced into the extruder in order to form a dough having a water content of 45%.

The dough is gelatinised at from 90° to 95° C. under a pressure of about 85 bars with vigorous mechanical working over a period of about 30 seconds.

The gelatinised dough is extruded through a cooled die having small holes of 0.9 mm. The extruded pasta is at a temperature of from 70° to 75° C. at the outlet of the die and it has a degree of gelatinisation of 93%. It is drawn during about 5 seconds through a bath containing 1% of $CaCl_2$. The pasta is then passed over an open mesh endless belt where the water which adheres to its surface is driven off and entrained by means of an air blast above and an air suction from below. If only the blowing from above is carried out, the water is driven off from the pasta laterally and the pasta cannot be maintained immobile on the belt. If only the suction from below is carried out, too much water remains on the surface of the pasta. However, if the effects of blowing from above and suction from below are combined, the pasta is well distributed laterally over the mesh, it lies flat thereon and is effectively freed from water which it has entrained on emerging from the $CaCl_2$ bath.

The pasta is then cut into lengths of about 2 m and is arranged in small piles by allowing it to fall vertically. The small piles or balls of pasta are dried for 2 hours at 70° to 80° C. at a relative humidity of 90%. They are then abruptly cooled using air at 30° C. and 90% relative humidity.

Maize pasta is obtained having a very pleasant appearance and presenting the colour of maize and a glazed aspect. It does not stick during cooking. After cooking for 4 minutes in gently boiling water, the behaviour of the pasta when chewed is between that of a cooked Italian pasta "al dente" and that of the rice pasta of the previous Example. The taste of the pasta is almost identical to that of a maize semolina which is cooked in the form of porridge or griddle cakes. The cooking water remains relatively clear. Losses during cooking amount to only 3 to 5%.

EXAMPLES 5 to 8

Maize pasta, potato pasta, soya pasta and lentil pasta is prepared in a manner similar to the one described in Example 4.

The following Table gives details concerning the composition of the dry mixtures, the respective quantities of dry mixture and of water introduced into the extruder, the gelatinisation temperature and pressure, the temperature at the outlet of the extrusion die, the water content and the degree of gelatinisation of the extruded pasta.

| Example No. | Dry mixture Composition | | Quantity (kg/h) | Water (l/h) |
| --- | --- | --- | --- | --- |
| 5 | Cornflour | 99% | 60 | 40 |
|   | Sodium alginate | 1% | | |
| 6 | Potato flour | 74% | 40 | 27 |

-continued

|  |  |  | | |
|---|---|---|---|---|
| 7 | Cornstarch | 25% | | |
|  | Sodium alginate | 1% | | |
|  | Defatted soya flour | 50% | 60 | 39 |
|  | Cornstarch | 49% | | |
|  | Sodium alginate | 1% | | |
| 8 | Lentil flour | 74% | 60 | 39 |
|  | Cornstarch | 25% | | |
|  | Sodium alginate | 1% | | |

| | Extrusion die outlet | | | |
|---|---|---|---|---|
| Example No. | Gelatinisation Temperature (°C.) | Pressure (bars) | Temperature (°C.) | Water content % | Degree of gelatinisation (%) |
| 5 | 75–88 | 90 | 62 | 41 | 74 |
| 6 | 61–68 | 80 | 60 | 46 | 33 |
| 7 | 73–90 | 85 | 57 | 42 | 55 |
| 8 | 75–87 | 77 | 59 | 45 | 97 |

After passing into the $CaCl_2$ bath, and after draining, cutting, forming of balls and drying under conditions similar to those described in Example 4, pasta of a pleasant glazed appearance is obtained each time, having the colour typical of the starchy material which was used. Likewise, the behaviour of the pasta when chewed is without fault and bears comparison with that of the pasta of Example 4.

With respect to the cornstarch which was used in Examples 6 to 8, it may be noted first of all that it was selected for its high amylose content with the objective of compensating for the high protein content of the soya and of the lentils and the high amylopectin content of the potato. However, it must also be noted that the indicated quantities are very generous and in fact it is not necessary to use as much to obtain the desired chewing behaviour of the pasta in question.

We claim:

1. A process for the production of pasta based on starchy materials, which comprises mixing a flour or semolina of a starchy material with soft water and an ionic gelling agent to obtain a dough containing from 35 to 55% of water, gelatinising the dough by heating and kneading under pressure, cooling the dough to a temperature below 100° C., extruding it in the form of pasta, bringing the pasta into contact with water containing a cation which forms a gel with the ionic gelling agent, and drying the pasta.

2. A process as claimed in claim 1 wherein the ionic gelling agent is an acid polysaccharide, and the cation is an alkaline-earth metal ion.

3. A process as claimed in claim 1, wherein the ionic gelling agent is an alginate and the cation is divalent calcium.

4. A process as claimed in claim 1, wherein the ionic gelling agent is added in a proportion of from 0.5 to 2% by weight of the dough, and the soft water has a concentration of calcium ions of less than $2 \times 10^{-4}M$.

5. A process as claimed in claim 1, wherein the dough is gelatinised by kneading under a pressure of from 70 to 100 bars at a temperature of from 60° to 100° C. over a period of 20 to 120 seconds.

6. A process as claimed in claim 1, wherein the dough is cooled to from 55° to 90° C. before extrusion.

7. A process as claimed in claim 1, wherein after extrusion the pasta is plunged for 2 to 30 seconds into water containing the cation in a concentration of from 0.05 to 0.2M.

8. A process as claimed in claim 1, wherein after the pasta has been brought into contact with water containing the cation, excess water adhering to the surface of the pasta is removed by blowing air downwards onto the pasta which is arranged on a foraminous support and by simultaneously sucking in air below said support.

9. A process as claimed in claim 1, wherein the pasta is dried at a temperature of from 50° to 90° C. and a relative humidity of from 30 to 90% over a period of from 2 to 4 hours.

10. A process as claimed in claim 1, wherein after drying, the pasta is abruptly cooled.

11. A process as claimed in claim 1, wherein the starchy material is selected from rice, maize, legumes and potatoes.

12. A pasta when produced by a process as claimed in any of claims 1 to 11.

* * * * *